United States Patent
Kitani

(10) Patent No.: US 8,436,923 B2
(45) Date of Patent: May 7, 2013

(54) IMAGING APPARATUS HAVING A FUNCTION FOR ESTIMATING A DARK CURRENT AMOUNT

(75) Inventor: Kazunari Kitani, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 823 days.

(21) Appl. No.: 11/775,725

(22) Filed: Jul. 10, 2007

(65) Prior Publication Data

US 2008/0012965 A1    Jan. 17, 2008

(30) Foreign Application Priority Data

Jul. 14, 2006    (JP) .................................. 2006-194755

(51) Int. Cl.
*H04N 9/64* (2006.01)
*H04N 3/14* (2006.01)
*H04N 5/235* (2006.01)

(52) U.S. Cl.
USPC ......... 348/243; 348/320; 348/362; 348/230.1

(58) Field of Classification Search .................. 348/243, 348/320, 362, 230.1
See application file for complete search history.

(56) References Cited

U.S. PATENT DOCUMENTS

| | | | |
|---|---|---|---|
| 2004/0189839 A1* | 9/2004 | McDermott | 348/243 |
| 2005/0030412 A1* | 2/2005 | Nakayama | 348/362 |
| 2007/0115372 A1* | 5/2007 | Wu et al. | 348/230.1 |

FOREIGN PATENT DOCUMENTS

| | | |
|---|---|---|
| JP | 2005-142829 A | 6/2005 |
| WO | 2005/004467 A1 | 1/2005 |

* cited by examiner

*Primary Examiner* — Luong T Nguyen
*Assistant Examiner* — Quang Le
(74) *Attorney, Agent, or Firm* — Canon USA Inc IP Division

(57) ABSTRACT

At least one exemplary embodiment is directed to an imaging apparatus including an image sensor including a light-shielded pixel area, a comparison unit configured to compare a light-shielded pixel output value output from at least a part of the light-shielded pixel area with a plurality of preset determination values, a counting unit configured to count a result of comparison performed by the comparison unit with respect to each of the plurality of determination values, and a calculation unit configured to estimate an amount of dark current generated in the image sensor based on a result of counting performed by the counting unit.

6 Claims, 14 Drawing Sheets

FIG. 9

| COUNTER 214 | COUNTER 213 | COUNTER 212 | COUNTER 211 | OUTLINE LEVEL | DARK LEVEL |
|---|---|---|---|---|---|
| Th4 | Th3 | Th2 | Th1 | | |
| L | L | L | L | MINUTE FLAW EXISTS BELOW Th1 | Dark0 |
| L | L | L | M1 | DISTRIBUTION OF FIRST MINUTE FLAW GROUP EXISTS BETWEEN Th1 AND Th2 | Dark1 |
| L | L | M1 | M1 | DISTRIBUTION OF FIRST MINUTE FLAW GROUP EXISTS BETWEEN Th2 AND Th3 | Dark2 |
| L | M1 | M1 | M1 | DISTRIBUTION OF FIRST MINUTE FLAW GROUP EXISTS BETWEEN Th3 AND Th4 | Dark3 |
| M1 | M1 | M1 | M1 | DISTRIBUTION OF FIRST MINUTE FLAW GROUP EXISTS ABOVE Th4 AND LEVEL OF SECOND MINUTE FLAW GROUP EXISTS BELOW Th1 | Dark4 |
| M1 | M1 | M1 | M2 | DISTRIBUTION OF SECOND MINUTE FLAW GROUP EXISTS BETWEEN Th1 AND Th2 | Dark5 |
| M1 | M1 | M2 | M2 | DISTRIBUTION OF SECOND MINUTE FLAW GROUP EXISTS BETWEEN Th2 AND Th3 | Dark6 |
| M1 | M2 | M2 | M2 | DISTRIBUTION OF SECOND MINUTE FLAW GROUP EXISTS BETWEEN Th3 AND Th4 | Dark7 |
| M2 | M2 | M2 | M2 | DISTRIBUTION OF SECOND MINUTE FLAW GROUP EXISTS ABOVE Th4 | Dark8 |
| M2 | M2 | M2 | M3 | DARK CURRENT COMPONENT + PART OF RANDOM NOISE COMPONENT EXIST ABOVE Th1 | Dark9 |

IMAGING APPARATUS HAVING A FUNCTION FOR ESTIMATING A DARK CURRENT AMOUNT

BACKGROUND OF THE INVENTION

1. Field of the Invention

The present invention relates to an imaging apparatus having an image sensor and to a control method therefor.

2. Description of the Related Art

An image sensor generates dark current in the case of performing long-time exposure with the image sensor, in the case of shooting at a high International Organization for Standardization (ISO) sensitivity, or in the case of shooting at a high temperature.

Dark current is generated because a solid-state image sensor has a characteristic of not only converting light energy into an electrical signal but also converting thermal energy into an electrical signal. Dark current has a high temperature dependency. When the temperature rises by 80 to 10° C., the amount of dark current output becomes twice as large.

In a solid-state image sensor, dark current affects image quality. Accordingly, manufacturers of an image sensor have used various methods for preventing high dark current from occurring.

When the temperature of the entire image sensor is high due to the environment under which the image sensor exists and a part of the image sensor (for example, an output stage amplifier) consumes much current (power), the temperature of the image sensor can partially rise. In such a case, dark current increases in the portion whose temperature has risen and the total amount of dark current generated in the image sensor becomes large.

For example, in the case of shooting a nightscape in a long exposure time (at a high ISO sensitivity), light of a magenta-like color appears in an area of an image when no light actually exists in the nightscape.

When the level of dark current in an image sensor becomes high and when dark current varies with pixel areas, the luminance and color balance in the image sensor can be affected. When the level of dark current becomes high in the entire image sensor, a dark level increases and, thus, the dynamic range of a photoelectrical signal decreases. Thus, an increase in dark current significantly affects image quality.

As a method for eliminating or reducing such affection from dark current, noise reduction processing (dark image subtraction processing) in a long exposure time is known. In the noise reduction processing, after an original image is taken, an image (a dark image) is taken in a state in which an image sensor is light-shielded under the same condition as the condition for shooting the original image, and then the taken dark image is subtracted from the original image.

In this regard, the dark image subtraction processing has the following problems. Firstly, in correctly and precisely eliminating the affection from dark current generated at the time of shooting an original image, it is desirable to obtain a dark image under the same condition as the condition for shooting the original image. Accordingly, when a long-time exposure is performed, a time as long as the time for the long-time exposure is additionally required for obtaining a dark image. Thus, the operability considerably degrades.

Secondly, in performing processing for subtracting a dark image from an original image, the level of random noise in the original image and the dark image increases to a $\sqrt{2}$ (root 2) multiple of that of the original image. Thus, a degradation of image quality cannot essentially be prevented.

In this regard, Japanese Patent Application Laid-Open No. 2005-142829 discusses a method in which a dark current component at the time of shooting an original image is detected and noise reduction processing is performed only when a resulting value exceeds a predetermined value, in order to possibly avoid performing noise reduction processing when the shooting condition does not necessarily require noise reduction processing.

Meanwhile, a white flaw, i.e., one of pixel defects of an image sensor, occurs in some cases. A white flaw is a pixel that appears as a white spot in an image, which occurs when the dark current in the pixel is considerably high compared to the dark current in other pixels and the output of the dark current thus becomes very high due to temperature rise or long exposure time.

Dark current at a white flaw is generated due to a crystal defect in a photodiode portion (a main portion constituting pixels of an image sensor) and changes according to exposure time and the temperature of the image sensor. Accordingly, a white flaw greatly affects dark current under a high temperature environment and in the case of long-time exposure. Furthermore, in the case where a high ISO sensitivity is used, that is, when a high level of gain can be applied to an output from the image sensor, an actual image is affected from a white flaw by the level equivalent to the level of the gain.

As a characteristic of a white flaw occurring dependent on temperature and exposure time, white flaws are distributed in several different slopes in a graph illustrating a relationship between exposure time and the output of white flaws under a predetermined temperature.

In determining whether to perform noise reduction processing, it is necessary to satisfy the following two requisites. First, noise reduction processing should not be performed when unnecessary in order to avoid an affection from noise reduction. Second, since the determination as to whether to perform noise reduction processing is automatically made in a conventional method, if any affection from dark current occurs, noise reduction processing is immediately performed. Thus, it is necessary to detect an amount of dark current with high accuracy.

However, it is very difficult to correctly and precisely determine an amount of dark current in an image area whose affection from dark current is barely visible. In particular, when an image is taken at a high ISO sensitivity and in a long exposure time, the image has a large amount of random noise components. Accordingly, in order to detect a correct absolute value of dark current under such condition, it is necessary to perform the detection after removing the random noise components.

Thus, in the case of processing with firmware, detection of an amount of dark current should be performed after reading a part of an image in an optically light-shielded area of an image sensor and removing random noise components. Thus, a large capacity of memory resources and a long time are required for calculation. In addition, it is difficult to secure a sufficient degree of detection accuracy.

In addition, in a system utilizing an analog front end (AFE) for clamping a dark level, a dark current component rarely appears on image data. Accordingly, it is difficult to perform a detection of dark current.

Furthermore, in a system utilizing an AFE for clamping a dark level, it is necessary to read a dark output before performing clamping of a dark level in order to detect an amount of dark current from a vertical optical black (VOB) portion. Moreover, in this regard, timing for starting a clamping operation within a limited area of an optical black portion needs to be delayed. Thus, lead-in time for clamping a large amount of dark current on an analog base is required. Accordingly, in a system utilizing an AFE, it is difficult to detect a dark current amount in a VOB portion.

In addition, the number of pixels whose outputs can be read before clamping is limited. Thus, it is very difficult to detect a precise dark current amount while eliminating an affection from noise in this case.

Meanwhile, the level of an output from a white flaw is higher than that of a dark current component from a normal pixel. Accordingly, if positional information of a minute defect pixel is previously available, an output of gain higher than dark current can be obtained by monitoring the pixel whose output is higher than the output of a dark current component from a normal pixel at the time of shooting. That is, by previously detecting a difference between a slope of dark current component distribution of a normal pixel and that of a white flaw, detection of a dark current component can be performed with high accuracy.

However, in order to perform such processing, it is necessary, during manufacturing of cameras, to detect, for each camera, a level and an address of a defect pixel and to store the detected address in each camera. In addition, in order to detect the level of output of a white flaw with high accuracy, it is necessary to detect a plurality of addresses of white flaws and to store the detected addresses in each camera. Such processing is very difficult to perform.

SUMMARY OF THE INVENTION

The present invention is directed to an imaging apparatus capable of easily detecting an amount of dark current with high accuracy and to a control method therefor.

According to an aspect of the present invention, an imaging apparatus includes an image sensor including a light-shielded pixel area; a comparison unit configured to compare a light-shielded pixel output value output from at least a part of the light-shielded pixel area with a plurality of preset determination values; a counting unit configured to count a result of comparison performed by the comparison unit with respect to each of the plurality of determination values; and a calculation unit configured to estimate an amount of dark current generated in the image sensor based on a result of counting performed by the counting unit.

According to another aspect of the present invention, a method for controlling an imaging apparatus including an image sensor having a light-shielded pixel area includes comparing a light-shielded pixel output value output from at least a part of the light-shielded pixel area with a plurality of preset determination values; counting a result of the comparison with respect to each of the plurality of determination values; and estimating an amount of dark current generated in the image sensor based on a result of the counting.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principle of the invention.

FIG. 9 illustrates a relationship among a count value on counters, a minute flaw level, and a dark current amount according to an exemplary embodiment of the present invention.

DETAILED DESCRIPTION OF THE EMBODIMENTS

Various exemplary embodiments, features, and aspects of the present invention will now herein be described in detail with reference to the drawings. It is noted that the relative arrangement of the components, the numerical expressions, and numerical values set forth in these embodiments are not intended to limit the scope of the present invention unless it is specifically stated otherwise.

Figure 1:
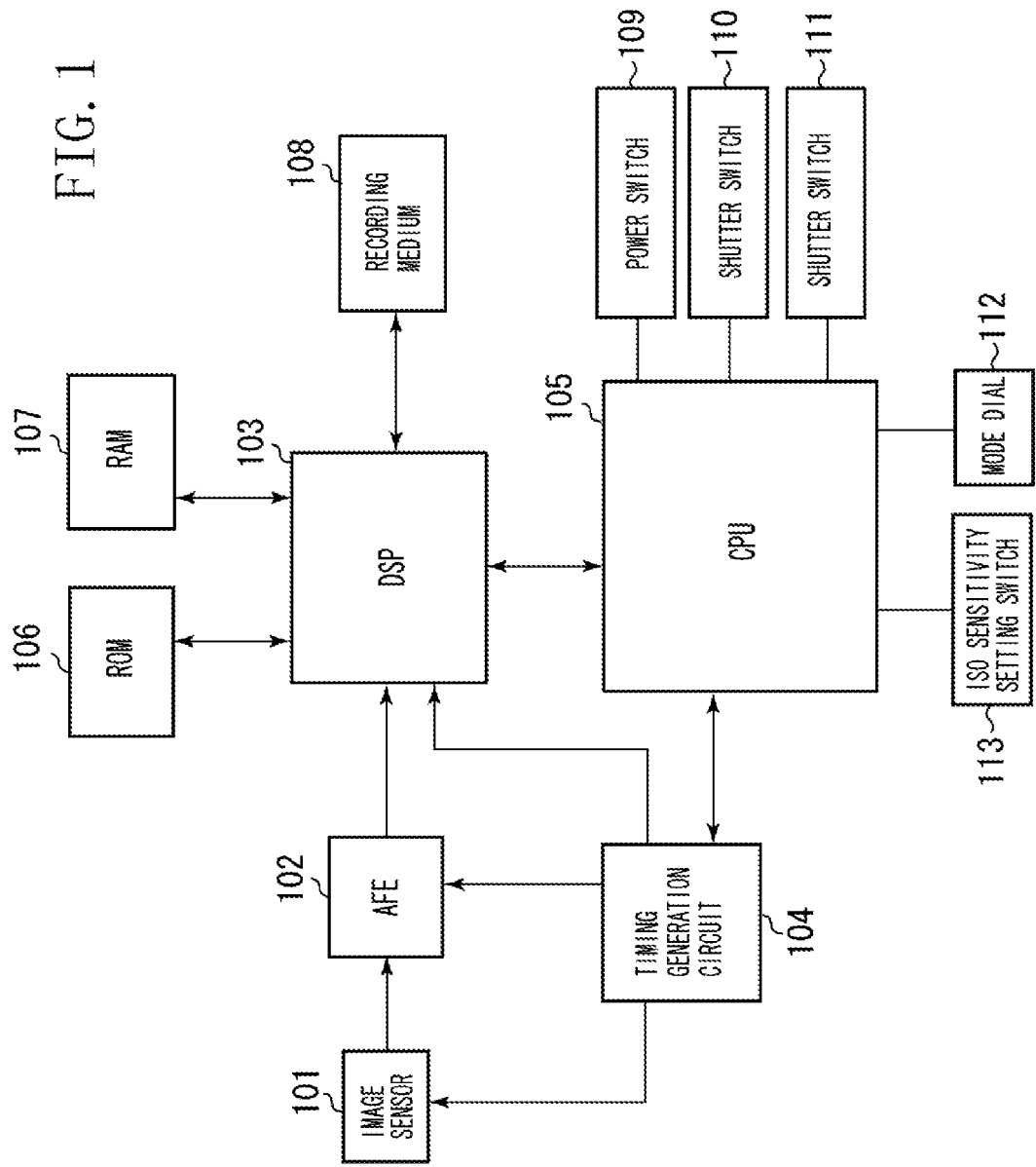
FIG. 1 illustrates an example configuration of an imaging apparatus according to an exemplary embodiment of the present invention.

In an exemplary embodiment, whether it is necessary to perform a noise reduction operation for preventing a degradation of image quality occurring due to dark current is determined based on a detected value on a cumulative histogram. FIG. 1 illustrates an exemplary configuration of an imaging apparatus according to an exemplary embodiment.

The imaging apparatus according to the present exemplary embodiment includes an image sensor 101, an analog front end (AFE) 102, a digital signal processor (DSP) 103, a timing generation circuit 104, and a central processing unit (CPU) 105. The imaging apparatus according to the present exemplary embodiment is a digital camera or a digital video camera, for example.

A complementary metal oxide semiconductor (CMOS) sensor, for example, is used for the image sensor 101. An amplifier circuit for changing gain according to an ISO sensitivity is built in the CMOS sensor. The AFE 102 includes an analog/digital (A/D) converter for analog-digital converting a signal from the image sensor 101. The AFE 102 has a function for clamping a dark offset level.

The DSP 103 performs various correction processing and development processing on data from the AFE 102. In addition, the DSP 103 controls various memories, such as a read-only memory (ROM) 106 and a random access memory (RAM) 107. Furthermore, the DSP 103 writes image data onto a recording medium 108. Moreover, the DSP 103 includes a histogram generation circuit (not shown).

The timing generation circuit 104 supplies a clock signal and a control signal to the image sensor 101, the AFE 102, and the DSP 103. The CPU 105 controls the DSP 103 and the timing generation circuit 104. The CPU 105 also controls a camera function using a photometry unit (not shown) and a ranging unit (not shown).

A power switch 109, a shutter switch 110, a shutter switch 111, a mode dial 112, and an ISO sensitivity setting switch 113 are connected to the CPU 105. The CPU 105 performs processing according to a setting state of the power switch 109, the shutter switch 110, the shutter switch 111, the mode dial 112, and the ISO sensitivity setting switch 113.

The ROM 106 stores a control program for the imaging apparatus (namely, a program to be executed by the CPU 105) and various correction data. The RAM 107 temporarily stores image data and correction data to be processed by the DSP 103. Various correction data used by the CPU 105 during processing is stored on the ROM 106, and is deployed on the RAM 107 to be used at the time of shooting. The RAM 107 is accessible at a higher speed than the ROM 106.

As the recording medium 108, a memory card for storing a taken image, for example, is used. The recording medium 108 is connected to the DSP 103 via a connector (not shown), for example.

The power switch 109 can be operated by a user to activate the imaging apparatus. The shutter switch 110 can be operated by a user to generate an instruction for starting an operation for processing, such as photometry processing and ranging processing.

The shutter switch 111 can be operated by a user to generate an instruction for starting a series of operations for taking an image, in which a mirror (not shown) and a shutter (not shown) are driven and a signal read from the image sensor 101 is written onto the recording medium 108 via the AFE 102 and the DSP 103.

The mode dial 112 can be operated by a user to select an operation mode of the imaging apparatus. The ISO sensitivity setting switch 113 can be operated by a user to set a shooting ISO sensitivity for the imaging apparatus.

Figure 2:
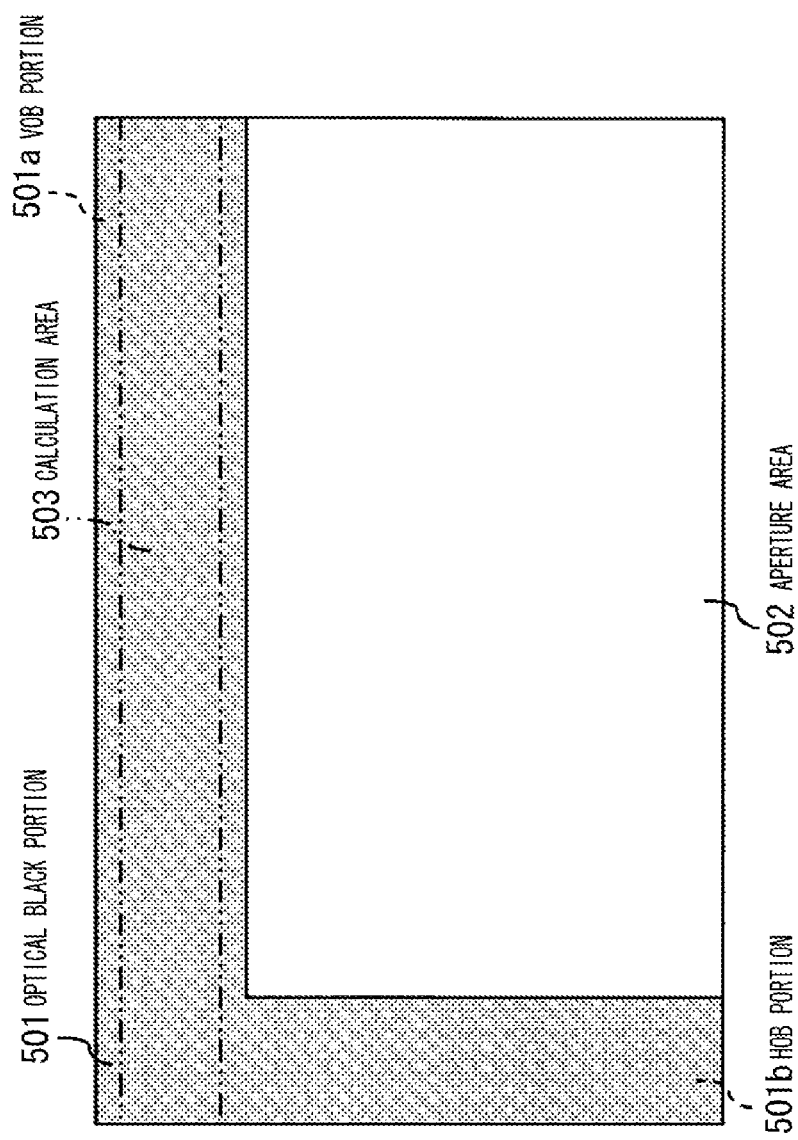
FIG. 2 illustrates an example configuration of an image sensor according to an exemplary embodiment of the present invention.

Now, the image sensor 101 will be described below. FIG. 2 illustrates an exemplary configuration of the image sensor 101. The image sensor 101 includes an optical black (OB) portion 501 and an aperture area 502. The OB portion 501 is an optically light-shielded pixel area. The OB portion 501 is partitioned into a vertical OB (VOB) portion 501a in an upper portion of the image sensor 101 and a horizontal OB (HOB) portion 501b in a left portion of the image sensor 101.

In an exemplary embodiment, a part of the VOB portion 501a is used as a calculation area 503. An amount of dark current in the calculation area 503 is estimated with processing described later below. Average dark current can generally be calculated by obtaining an average value of an output of the VOB portion 501a, which is light-shielded as described above.

However, when a clamping operation is set to be active for the VOB portion 501a using an AFE having a clamping function as in the present exemplary embodiment, clamping is performed also on an average dark current component. Thus, when the clamping operation is completed, no dark current component appears in an area other than the VOB portion 501a. On the other hand, the clamping function of an AFE is very useful in securing a dynamic range of a signal at the time of shooting in an area whose dark current component is large.

Figure 3:
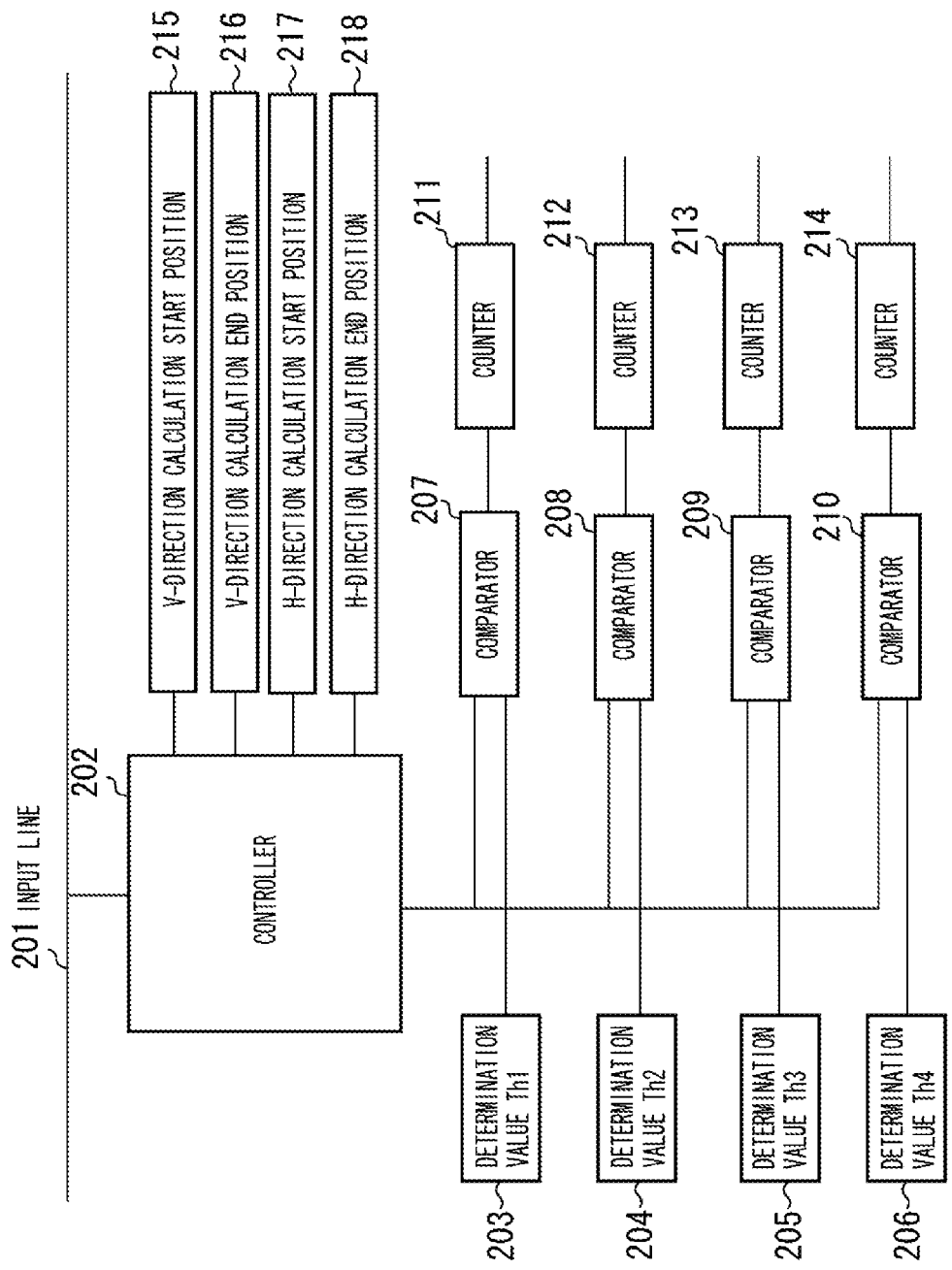
FIG. 3 is a block diagram illustrating an example histogram generation circuit according to an exemplary embodiment of the present invention.

In addition, the DSP 103 includes a histogram generation circuit illustrated in FIG. 3. FIG. 3 is a block diagram illustrating a histogram generation circuit. FIG. 3 illustrates an example of a case where four comparators are used. The histogram generation circuit includes an input line 201 through which image data is input. The input line 201 is connected to a controller 202. The controller 202 detects whether image data input in the input line 201 is data extracted from the calculation area 503.

Registers 215, 216, 217, and 218 are connected to the controller 202. A value indicating a V-direction calculation start position is set on the register 215. A value indicating a V-direction calculation end position is set on the register 216. A value indicating an H-direction calculation start position is set on the register 217. A value indicating an H-direction calculation end position is set on the register 218.

The controller 202 refers to the values set for the registers 215, 216, 217, and 218 and, if it is determined that the input image data is data extracted from the calculation area 503, outputs a pixel output to a plurality of comparators 207, 208, 209, and 210.

The comparators 207, 208, 209, and 210 respectively compare determination values Th1, Th2, Th3, and Th4 set on registers 203, 204, 205, and 206 with pixel outputs to be processed. Here, a relationship "Th1<Th2<Th3<Th4" exists among the determination values Th1 through Th4. The determination values Th1 through Th4 are stored on the ROM 106 or the RAM 107. The determination values Th1 through Th4 are respectively set for the registers 203 through 206 before a shooting operation.

Counters 211 through 214 are respectively connected to output terminals of the comparators 207, 208, 209, and 210. The counters 211 through 214 respectively count the number of pixels in the calculation area 503 whose output exceeds the determination values Th1, Th2, Th3, and Th4, and stores the counted number of pixels.

An output signal of the counters 211 through 214 can be read. The CPU 105 performs detection using the output signal of the counters 211 through 214. That is, an amount of dark current is calculated according to a count value obtained by the counters 211 through 214.

Accordingly, since a value indicating a position of the calculation area 503 is set to each of the registers 215 through 218, the counters 211 through 214 store the number of pixels exceeding each of the determination valued Th1 through Th4 at the time when reading from the calculation area 503 is completed. The stored number of pixels indicates a cumulative histogram.

Now, a method for calculating the determination values Th1 through Th4 will be described below. With respect to an amount (level) of dark current and occurrence of a white flaw, the following natural phenomena occur:

(a) When exposure time becomes long or the temperature of an image sensor becomes high, the level of dark current becomes high.

(b) When exposure time becomes long or the temperature of an image sensor becomes high, a minute flaw (white flaw), which has not appeared in the case of a short exposure time and low temperature, appears. Furthermore, the amount (level) of the white flaw varies according to the length of exposure time and the temperature of an image sensor.

In this regard, in the present exemplary embodiment, an amount of dark current is estimated according to the amount (level) of the minute flaw. The determination values Th1 through Th4 are used for detecting the level of the minute flaw. That is, the determination values Th1 through Th4 are used as reference values for detection of the minute flaw level.

FIGS. 4A through 4D each illustrate a histogram of a dark image in the order of exposure time. FIGS. 5A through 5D each illustrate a cumulative histogram of a dark image in the order of exposure time.

Figure 4A:
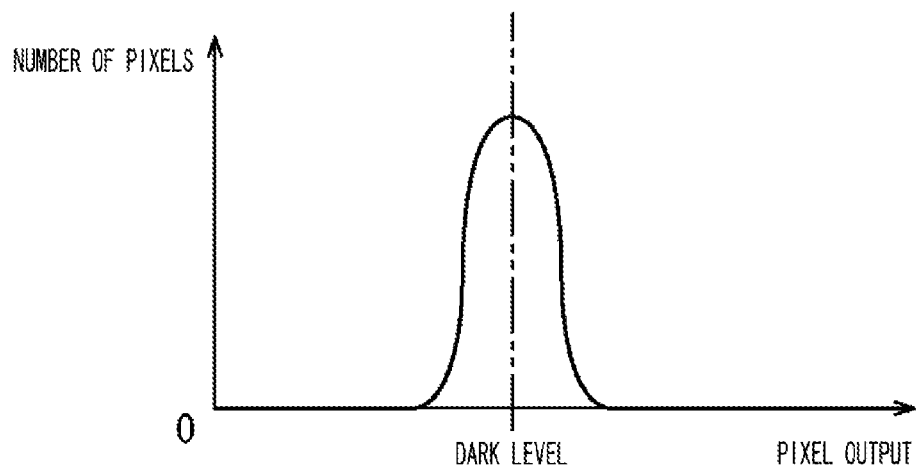
FIG. 4A illustrates a histogram of a dark image according to an exemplary embodiment of the present invention.

As illustrated in FIG. 4A, when exposure time is very short, almost no dark current is generated. Thus, the histogram indicates a distribution around a set dark level. The slight unevenness is equivalent to the level of random noise. Under this condition, almost no white flaw exists.

Figure 5A:
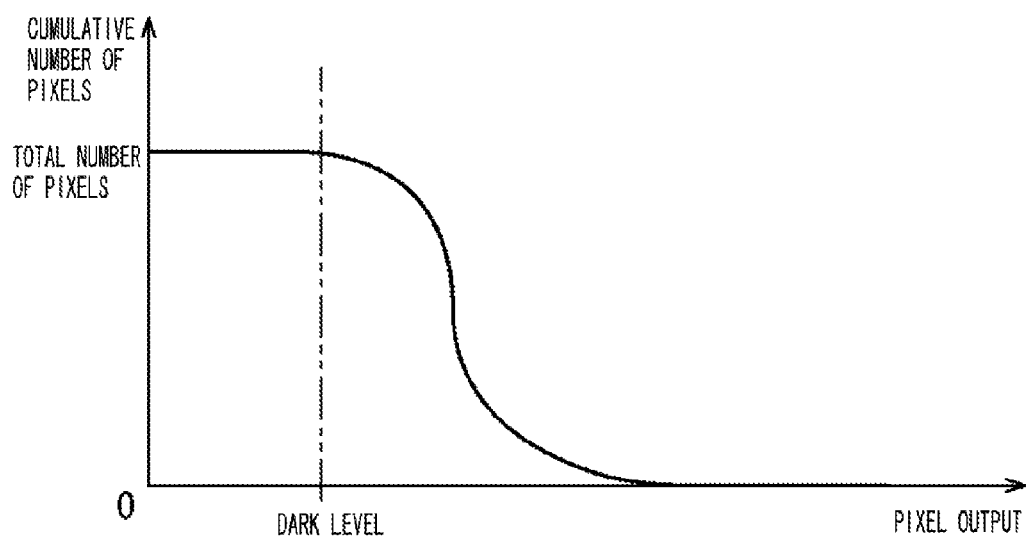
FIG. 5A illustrates a cumulative histogram of a dark image according to an exemplary embodiment of the present invention.

FIG. 5A illustrates a cumulative histogram corresponding to the histogram illustrated in FIG. 4A. As illustrated in FIG. 5A, the cumulative number of pixels starts to fall around the dark level and becomes close to zero in the vicinity of a total sum of the dark level and the random noise. Here, a point at which the dark level reaches a threshold value on a cumulative histogram is set as a "determination value Th1".

Figure 4B:
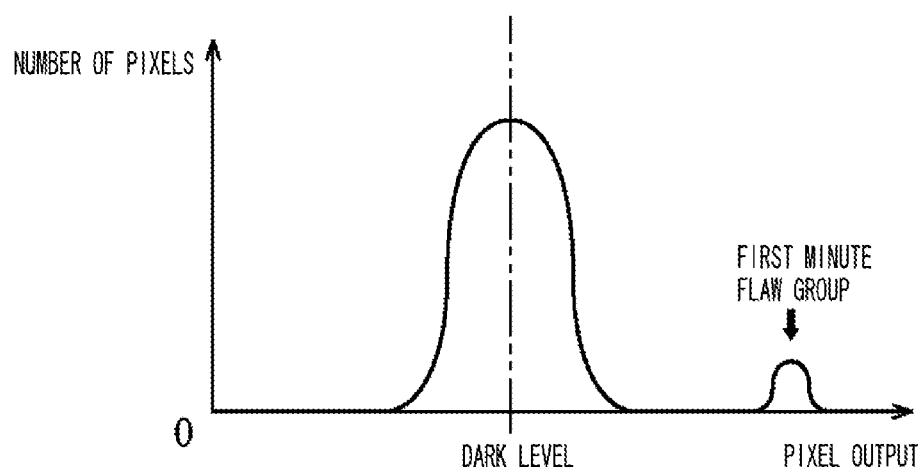
FIG. 4B illustrates a histogram of a dark image in the case where exposure time is longer than that in the case of the example illustrated in FIG. 4A according to an exemplary embodiment of the present invention.

As illustrated in FIG. 4B, when exposure time is slightly longer than that in the example in FIG. 4B, a small distribution appears on the histogram in a range whose output is higher than the dark level, in addition to the distribution existing around the dark level. That is, white flaws start to appear. Hereinbelow, such an additional distribution is referred to as a "first minute flaw group".

The occurrence of the first minute flaw group indicates that crystal defects having substantially the same output level have occurred at a specific ratio among all of the pixels of an image sensor. The level of distribution of a group of flaws occurring under a specific shooting condition is substantially the same even under a different shooting condition.

Figure 5B:
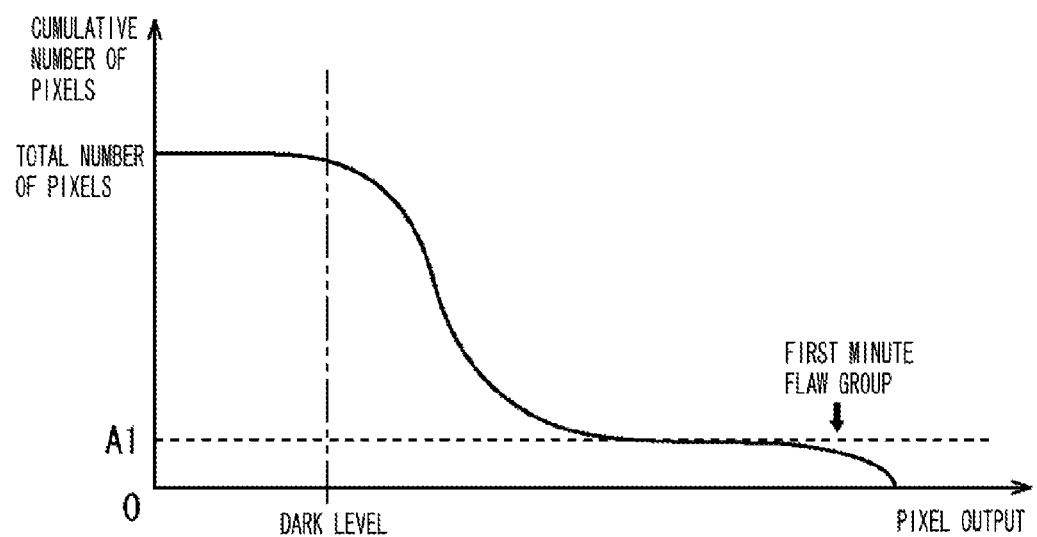
FIG. 5B illustrates a cumulative histogram of a dark image in the case where exposure time is longer than that in the case of the example illustrated in FIG. 5A according to an exemplary embodiment of the present invention.

As illustrated in FIG. 5B, the cumulative histogram obtained in the case of such exposure time has a flat portion. Based on the flat portion, the number of white flaws A1 belonging to the first minute flaw group can be identified.

Figure 4C:
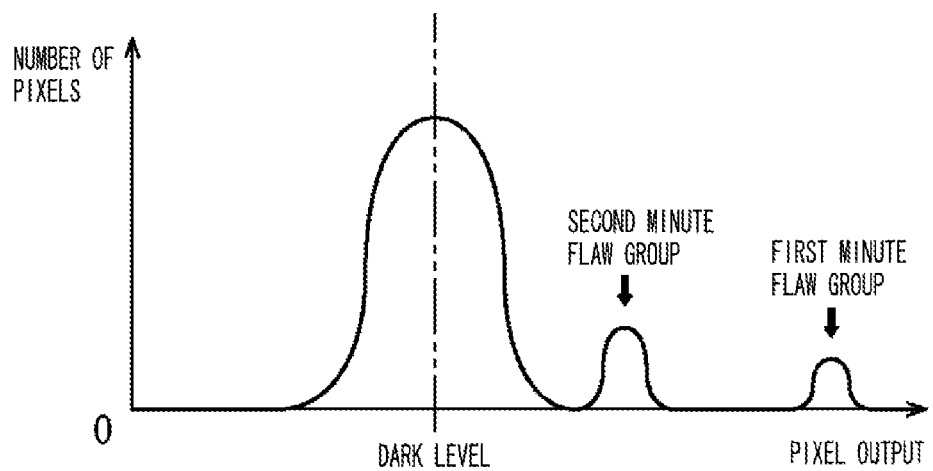
FIG. 4C illustrates a histogram of a dark image in the case where exposure time is longer than that in the case of the example illustrated in FIG. 4B according to an exemplary embodiment of the present invention.

As illustrated in FIG. 4C, when the exposure time is longer than that in the example illustrated in FIG. 4B, two small distributions appear on the histogram in a range whose output is higher than the dark level, in addition to the distribution existing around the dark level. The distribution whose output is higher of the two small distributions indicates an increase of output of the first minute flaw group illustrated in FIG. 4B. The distribution whose output is smaller of the two small distributions is a newly generated distribution. Hereinbelow, the latter distribution is referred to as a "second minute flaw group".

The occurrence of the second minute flaw group indicates that defect pixels different from those in the first minute flaw group that behave in the same manner as the defect pixels in the first minute flaw group have occurred. At this time, the entire distribution existing around the dark level becomes large because the random noise has further increased due to the extension of the exposure time.

Figure 5C:
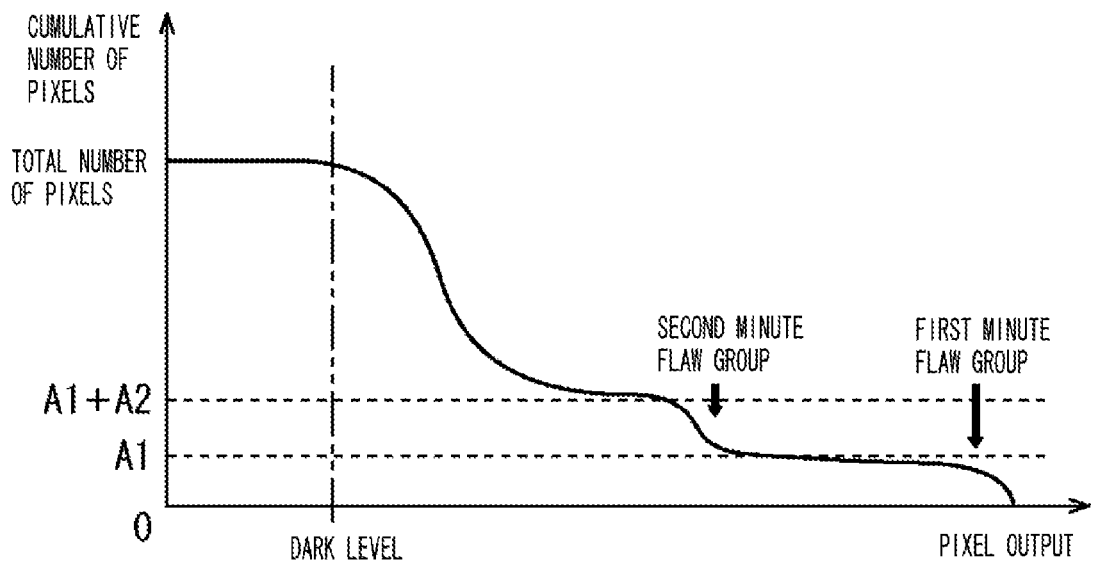
FIG. 5C illustrates a cumulative histogram of a dark image in the case where exposure time is longer than that in the case of the example illustrated in FIG. 5B according to an exemplary embodiment of the present invention.

As illustrated in FIG. 5C, a cumulative histogram obtained in the case of such exposure time has a lower-level portion as a variation indicating that the second minute flaw group has appeared. However, the number of white flaws A2 belonging to the second minute flaw group cannot be identified at this time.

Figure 4D:
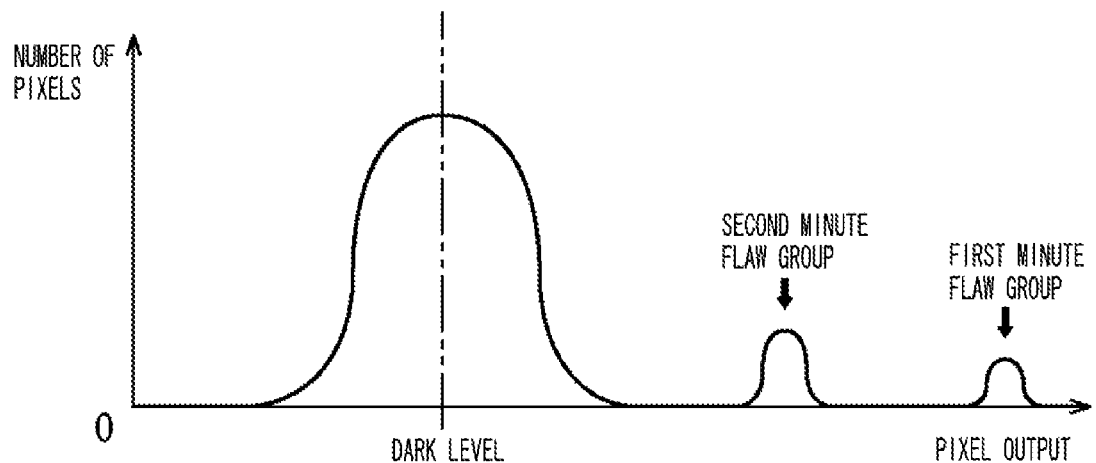
FIG. 4D illustrates a histogram of a dark image in the case where exposure time is longer than that in the case of the example illustrated in FIG. 4C according to an exemplary embodiment of the present invention.

When the exposure time becomes further longer, as illustrated in FIG. 4D, small distributions exist on the histogram in ranges whose output is higher than the dark level, in addition to the distribution existing around the dark level. Each of the small distributions is the result of a further increase of the output of the first and the second minute flaw groups, respectively.

Figure 5D:
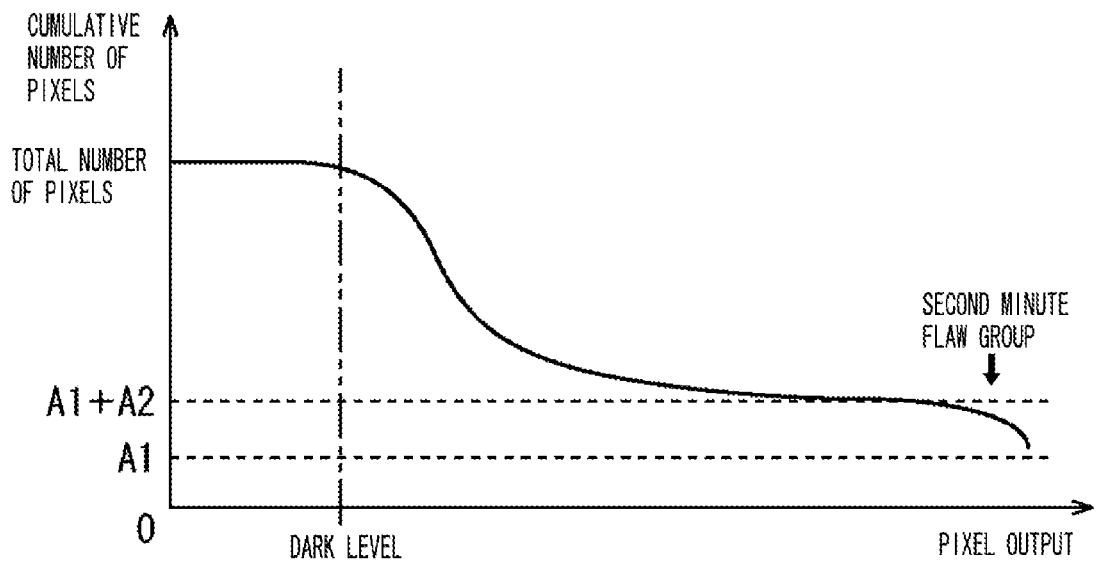
FIG. 5D illustrates a cumulative histogram of a dark image in the case where exposure time is longer than that in the case of the example illustrated in FIG. 5C according to an exemplary embodiment of the present invention.
Figure 6A:
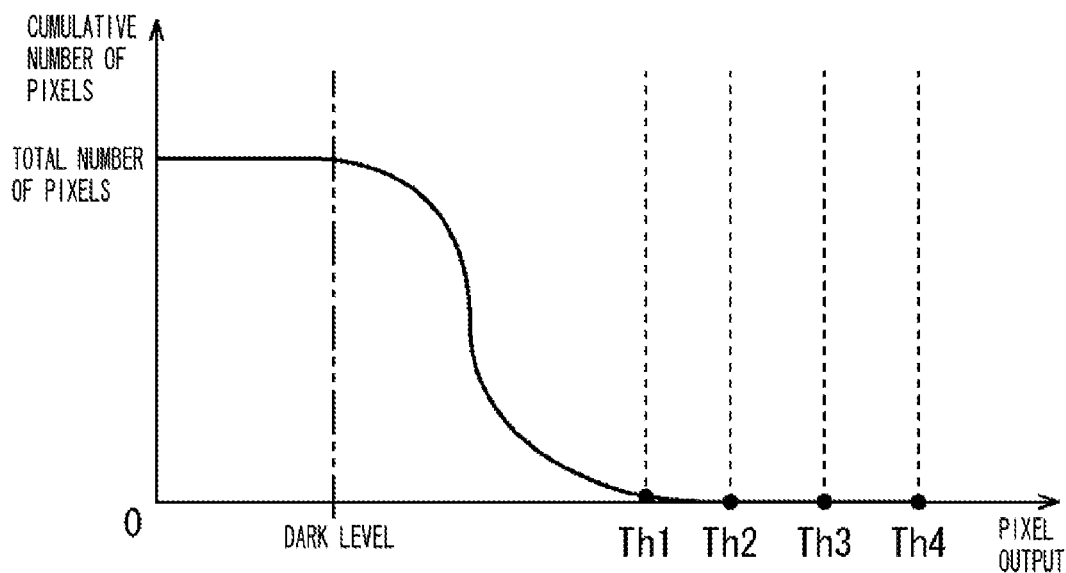
FIG. 6A illustrates determination values Th1 through Th4 on the diagram illustrated in FIG. 5A according to an exemplary embodiment of the present invention.
Figure 6B:
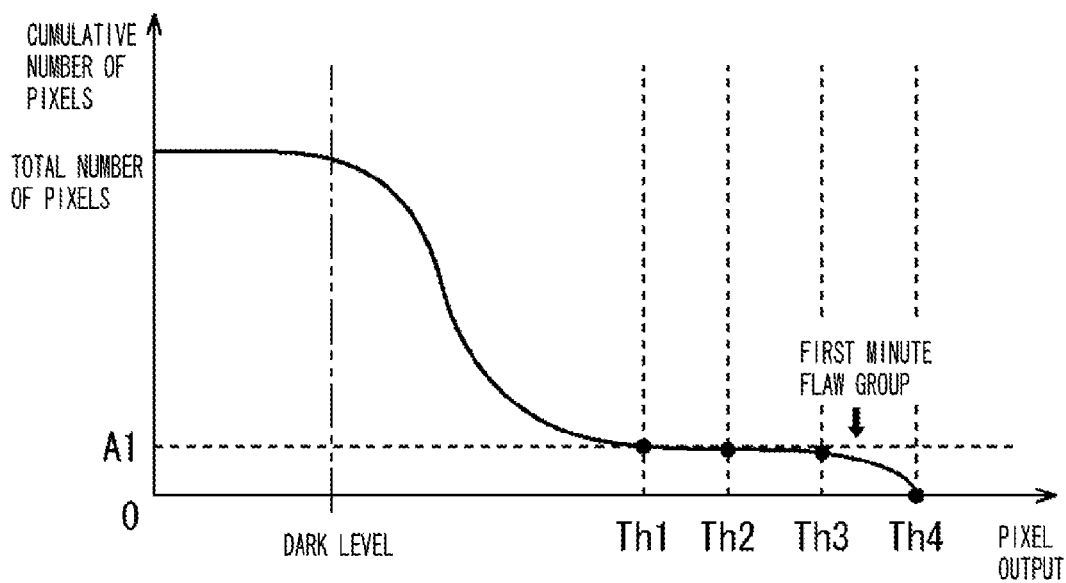
FIG. 6B illustrates determination values Th1 through Th4 on the diagram illustrated in FIG. 5B according to an exemplary embodiment of the present invention.
Figure 6C:
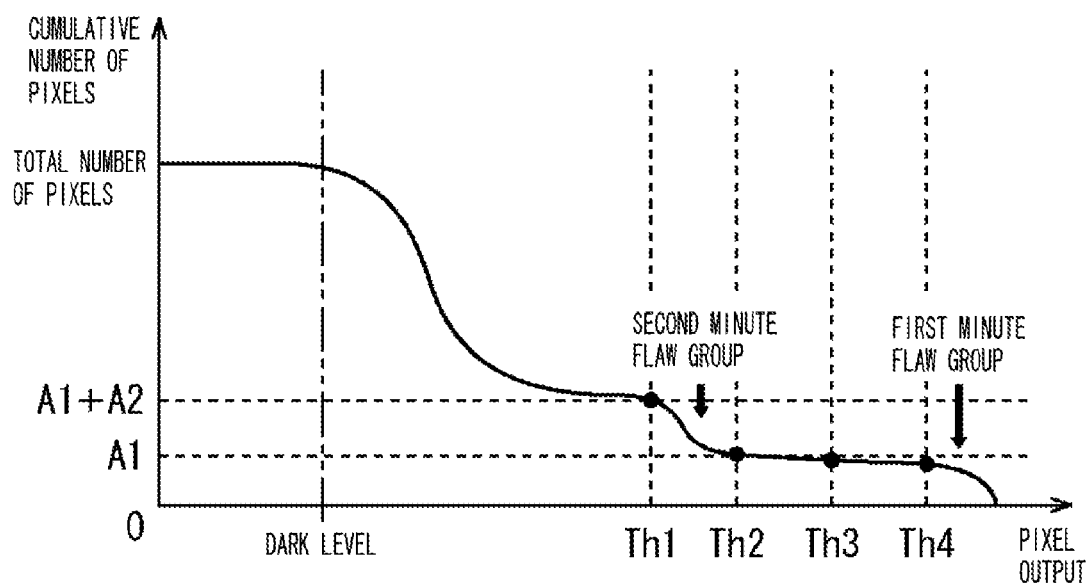
FIG. 6C illustrates determination values Th1 through Th4 on the diagram illustrated in FIG. 5C according to an exemplary embodiment of the present invention.
Figure 6D:
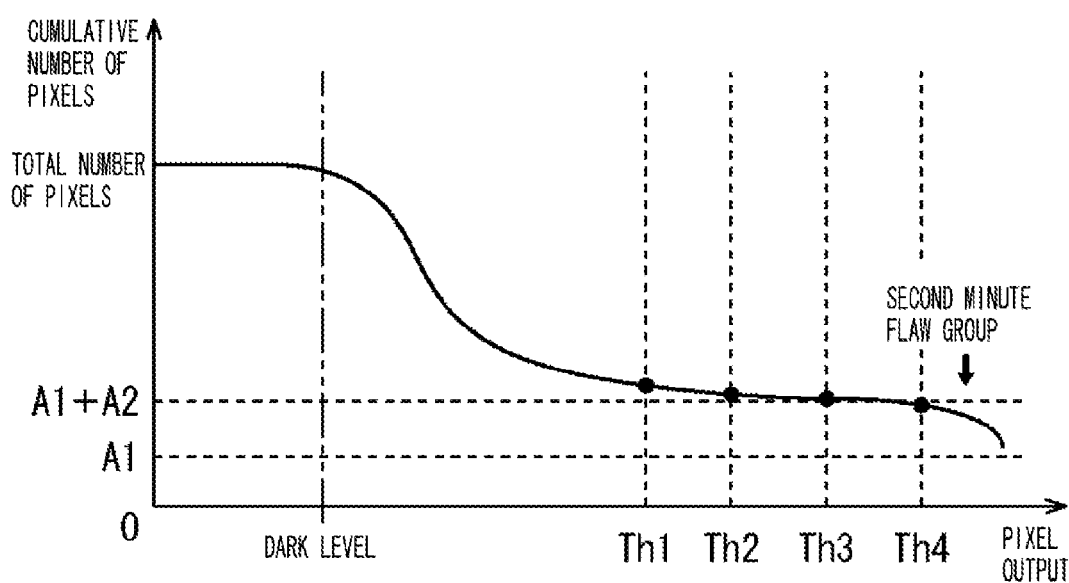
FIG. 6D illustrates determination values Th1 through Th4 on the diagram illustrated in FIG. 5D according to an exemplary embodiment of the present invention.

As illustrated in FIG. 5D, a cumulative histogram obtained in the case of such exposure time has a flat portion positioned higher than the flat portion illustrated in FIG. 5B. A sum of the number of white flaws A1 belonging to the first minute flaw group and the number of white flaws A2 belonging to the second minute flaw group can be identified according to the flat portion. Thus, the number of white flaws A2 belonging to the second minute flaw group can be identified.

Furthermore, a point at which the number of flaws in the second minute flaw group becomes maximum in the flat range on the cumulative histogram is set as a "determination value Th4". Then, the range between the determination values Th1 and Th4 is divided into three equal ranges, and resulting equally-distanced points are respectively set as a "determination value Th2" and a determination value Th3".

The determination values Th1 through Th4 can be set during manufacture of the imaging apparatus. However, the determination values Th1 through Th4 can be set by automatic calibration or manual calibration.

FIGS. 4A through 4D, FIGS. 5A through 5D, and FIGS. 6A through 6D illustrate changes of a histogram and a cumulative histogram depending on the length of exposure time. A similar pattern appears in the case of changing temperature. Accordingly, the determination values Th1 through Th4 can be defined by generating a histogram and a cumulative histogram while changing temperature.

The histogram and the cumulative histogram differ with each image sensor. However, the histogram and the cumulative histogram do not differ much with image sensors manufactured in the same process. In this regard, in the present exemplary embodiment, a plurality of samples is previously manufactured in the same process as that for an image sensor to be actually manufactured, and a cumulative histogram is generated with respect to each sample.

The determination values Th1 through Th4 as illustrated in FIGS. 6A through 6D can be set according to a typical cumulative histogram. As a typical cumulative histogram, an average of cumulative histograms or a cumulative histogram existing at a most intermediate level can be used.

In setting the determination values Th1 through Th4, the determination values Th1 through Th4 can be calculated based on the above-described method according to a cumulative histogram of each sample, and an average of each of the determination values Th1 through Th4 can be calculated.

Figure 7:
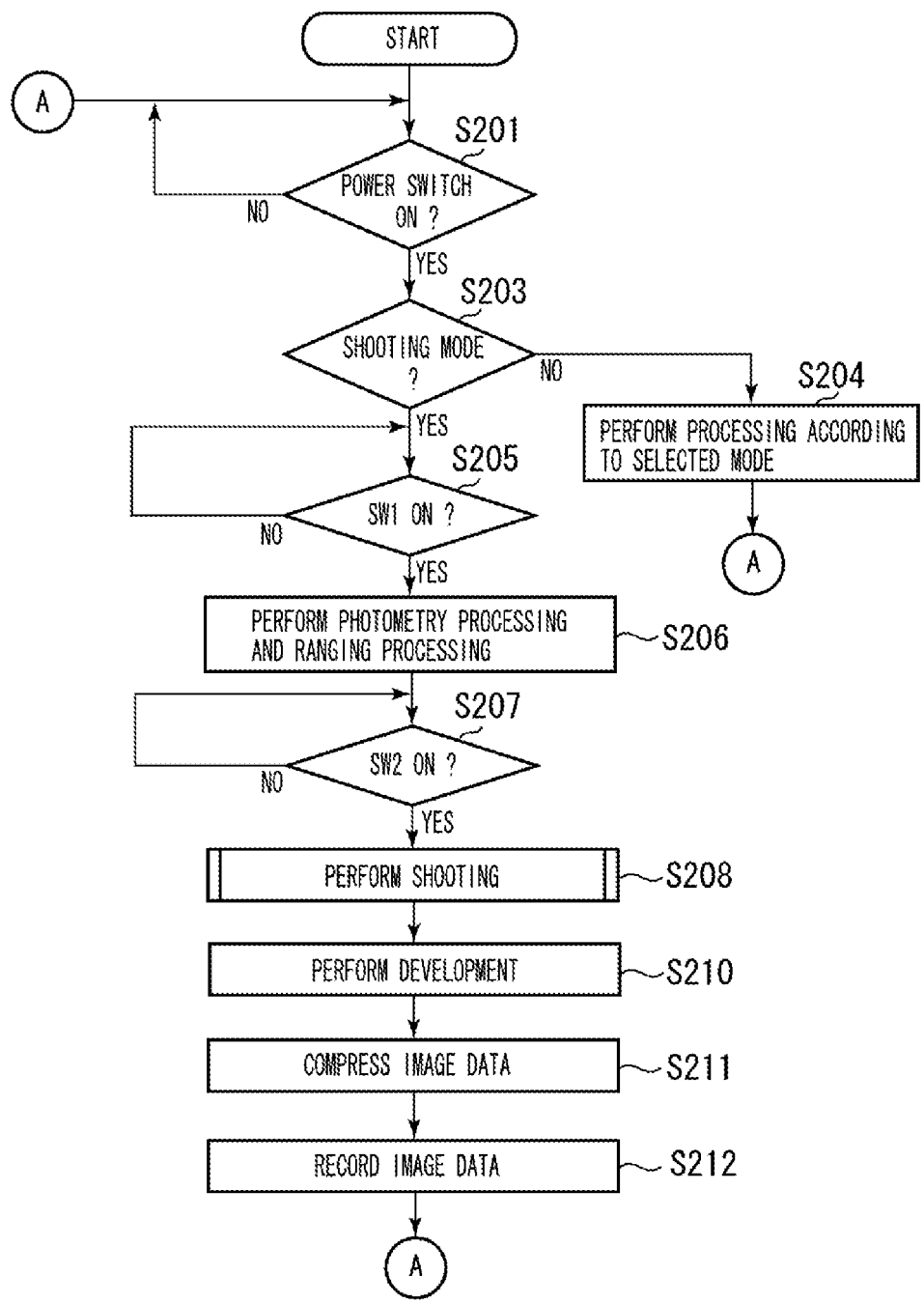
FIG. 7 is a flow chart illustrating an example method for controlling the imaging apparatus according to an exemplary embodiment of the present invention.

Now, a method for controlling the imaging apparatus having the above-described configuration will be described below. FIG. 7 is a flow chart illustrating a method for controlling the imaging apparatus according to an exemplary embodiment of the present invention. The control operation is mainly performed by the CPU 105.

Referring to FIG. 7, in step S201, the CPU 105 detects whether the power switch 109 is ON. The CPU 105 repeats the detection until it is detected that the power switch 109 is ON. If it is detected in step S201 that the power switch 109 is ON (YES in step S201), then the CPU 105 advances to step S203.

In step S203, the CPU 105 detects whether the mode dial 112 is set to the shooting mode. If it is detected in step S203 that the mode dial 112 is set to the shooting mode (YES in step S203), then the CPU 105 advances to step S205. On the other hand, if it is detected in step S203 that the mode dial 112 is set to a mode other than the shooting mode (NO in step S203), then the CPU 105 advances to step S204.

In step S204, the CPU 105 performs processing according to the selected mode. After the processing according to the selected mode is completed, the CPU 105 returns to step S201. In step S205, the CPU 105 detects whether the shutter switch 110 is ON. The CPU 105 repeats the detection until it is detected that the shutter switch 110 is ON. If it is detected in step S205 that the shutter switch 110 is ON (YES in step S205), then the CPU 105 advances to step S206.

In step S206, the CPU 105 performs photometry processing for determining an aperture value (F number) and a shutter speed with a photometry control unit (not shown) and ranging processing for focusing a photographic lens on an object with a ranging control unit (not shown). In step S207, the CPU 105 detects whether the shutter switch 111 is ON and repeats the detection until it is detected that the shutter switch 111 is ON. If it is detected in step S207 that the shutter switch 111 is ON (YES in step S207), then the CPU 105 advances to step S208.

In step S208, the CPU 105 performs shooting processing. The shooting processing will be described later below. In step S210, the CPU 105 performs processing for developing the taken image data with the DSP 103. In step S211, the CPU 105 performs compression processing on the developed image data with the DSP 103 and stores the compressed image data in a free space of the RAM 107.

In step S212, the CPU 105 reads the image data stored on the RAM 107 with the DSP 103 and stores the read image data on the recording medium 108 with the DSP 103. After the image data is recorded, the CPU 105 returns to step S201 to wait for a next shooting operation.

Figure 8:
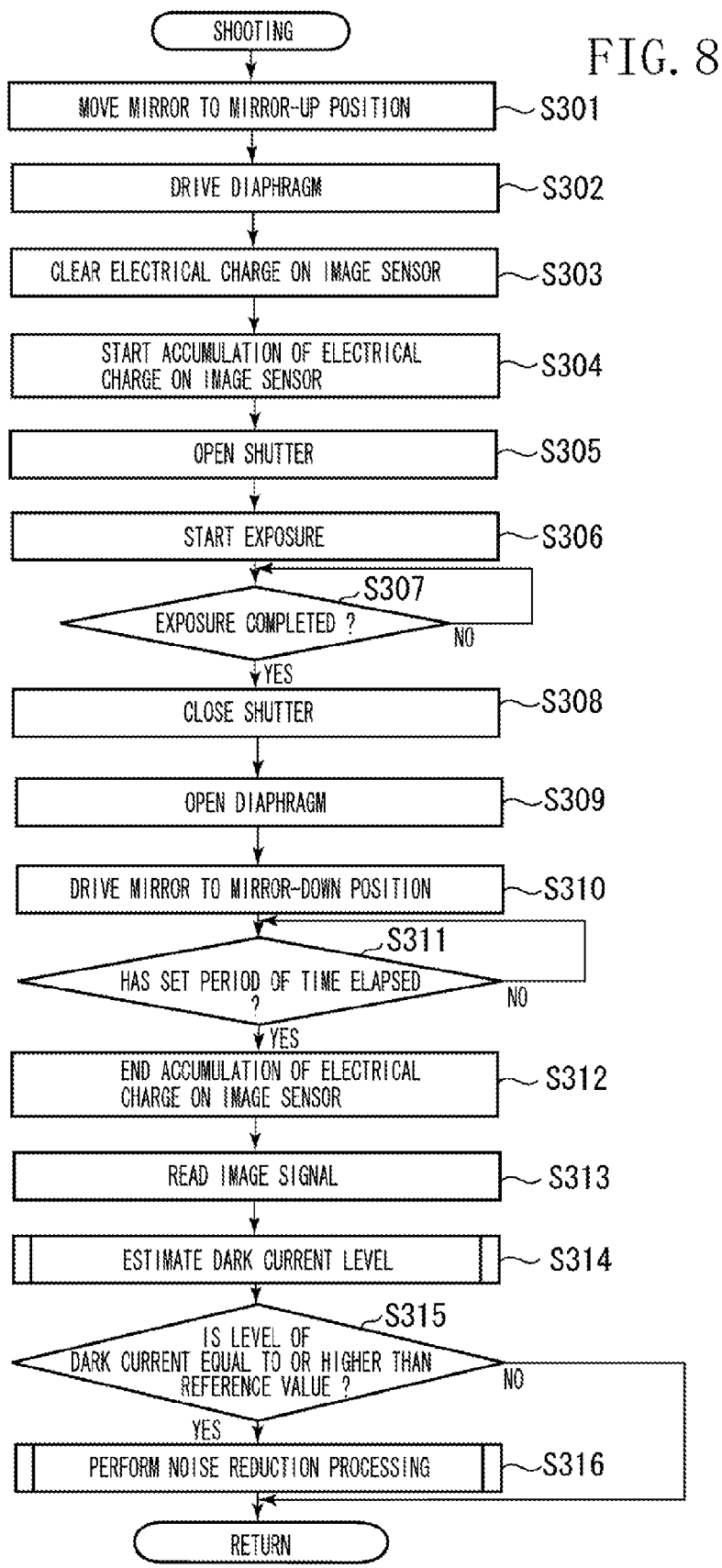
FIG. 8 is a flow chart illustrating an example operation performed in shooting processing according to an exemplary embodiment of the present invention.

Now, the shooting processing in step S208 will be described below with reference to FIG. 8. FIG. 8 is a flow chart illustrating an operation performed in the shooting processing. In step S301, the CPU 105 moves the mirror to a mirror-up position. In step S302, the CPU 105 drives a diaphragm to a predetermined aperture value according to photometry data obtained in the photometry processing in step S205.

In step S303, the CPU 105 clears electrical charge on the image sensor 101. In step S304, the CPU 105 starts accumulating electrical charge on the image sensor 101. In step S305, the CPU 105 opens the shutter. In step S306, the CPU 105 starts exposure of the image sensor 101.

In step S307, the CPU 105 waits until the exposure is completed according to the photometry data. When the exposure end time has elapsed (YES in step S307), the CPU 105 advances to step S308. In step S308, the CPU 105 closes the shutter. In step S309, the CPU 105 drives the diaphragm to a full aperture value. In step S310, the CPU 105 drives the mirror to a mirror-down position.

In step S311, the CPU 105 waits until the set electrical charge accumulation time elapses. When the set electrical charge accumulation time has elapsed (YES in step S311), the CPU 105 advances to step S312. In step S312, the CPU 105 ends the accumulation of electrical charge on the image sensor 101.

In step S313, the CPU 105 reads a signal from the image sensor 101. In this processing, the image sensor 101 changes an amplifier gain value to a gain value according to the ISO sensitivity set by the user by operating the ISO sensitivity setting switch 113. Here, the AFE 102, having a function for clamping a dark offset level, performs a clamping operation using an output from the OB portion 501 of the image sensor 101.

In step S314, at the same time as the start of reading, the DSP 103 estimates an amount of dark current. The estimation of the dark current amount will be described in detail later below. In step S315, the CPU 105 compares the dark current amount detected in step S314 with the reference value previously set and stored in the ROM 106 or the RAM 107. The reference value is, for example, an amount of dark current with which noise reduction processing is required.

If it is detected in step S315 that the value of the dark current amount is smaller than the reference value (NO in step S315), then the CPU 105 ends the processing. On the other hand, if it is detected in step S315 that the value of the dark current amount is equal to or larger than the reference value (YES in step S315), then the CPU 105 advances to step S316. In step S316, the CPU 105 performs noise reduction processing. The noise reduction processing will be described later below.

After the above-described processing ends, the CPU 105 ends the shooting processing and advances to step S210.

Now, the processing for estimating the dark current amount in step S314 will be described below. As described above, in the present exemplary embodiment, the dark current amount is estimated according to the level of minute flaws.

In the estimation processing, the comparators 207, 208, 209, and 210 respectively compare the processing pixel outputs with the determination values Th1 through Th4, and the counters 211 through 214 respectively count the results of the comparison.

That is, the level of minute flaws is identified according to the count values of the counters 211 through 214. The dark current amount is estimated according to the minute flaw level. Thus, the DSP 103 performs the dark current amount estimation processing.

Now, a relationship among the count value of the counters 211 through 214, the minute flaw level, and the dark current amount (dark level) will be descried below. FIG. 9 illustrates the relationship among the count value of the counters 211 through 214, the minute flaw level, and the dark current amount.

For each of the dark levels "Dark 0" through "Dark 9" in FIG. 9, a previously measured value is set. In FIG. 9, the dark current amount increases in the order from "Dark 0" to "Dark 9". Here, the configuration can be arranged such that in the case of "Dark 0", the noise reduction processing (step S316) is not performed because the dark current amount is below the determination value in the processing in step S315.

In FIG. 9, "L" indicates that the range of the count values of the counters 211 through 214 is "0 to 0+N1". "M1" in FIG. 9 indicates that the range of the count values of the counters 211 through 214 is "(the number of white flaws A1−N2) to (the number of white flaws A1+N2)". "M2" in FIG. 9 indicates that the range of the count values of the counters 211 through 214 is "(the total sum of the number of white flaws A1 and the number of white flaws A2−N3) to (the total sum of the number of white flaws A1 and the number of white flaws A2+N3)".

"M3" in FIG. 9 indicates that the range of the count values of the counters 211 through 214 is equal to or larger than "(the total sum of the number of white flaws A1 and the number of white flaws A2+N4)". Here, "N1" is a threshold value of the dark level referred to in determining the determination value Th1. "N2", "N3", and "N4" are marginal values that can be arbitrarily set with unevenness of the numbers of white flaws A1 and A2 taken into consideration.

A relatively large difference exists between the level of the first minute flaw group and the level of the second minute flaw group. Accordingly, each of the marginal values N1 through N4 can be set at a large value as long as the values "L", "M1", "M2", and "M3" do not overlap one another.

Figure 10:
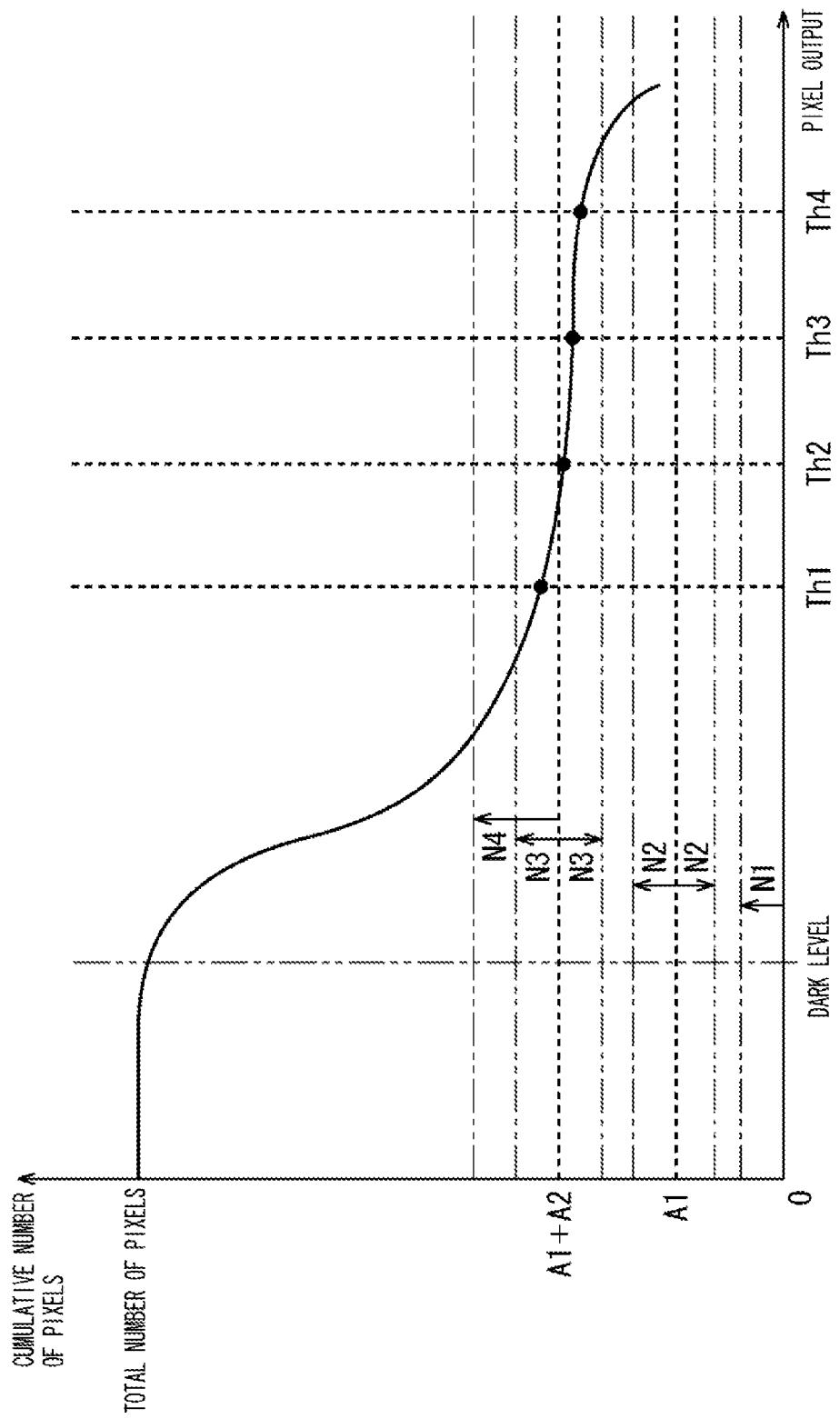
FIG. 10 illustrates a relationship between a cumulative histogram and a reference value according to an exemplary embodiment of the present invention.

FIG. 10 illustrates an example of such reference values and also illustrates an example of the cumulative histogram. In the example illustrated in FIG. 10, the count values of the counters 211 through 214 are "M2". Thus, the dark level is "Dark 8" (FIG. 9). Here, because the dark current amount of "Dark 8" is calculated by the actual determination previously performed, the noise reduction processing (step S316) according to the calculated amount can be performed.

Now, the noise reduction processing will be described with reference to a flow chart illustrated in FIG. 11. The "noise reduction processing" refers to processing for subtracting a dark image, which is accumulated for the time length equivalent to the time length for exposure of an original image, from the original image. Before starting the noise reduction processing, the original image previously taken has not been developed yet and is temporarily stored on the RAM 107.

Figure 11:
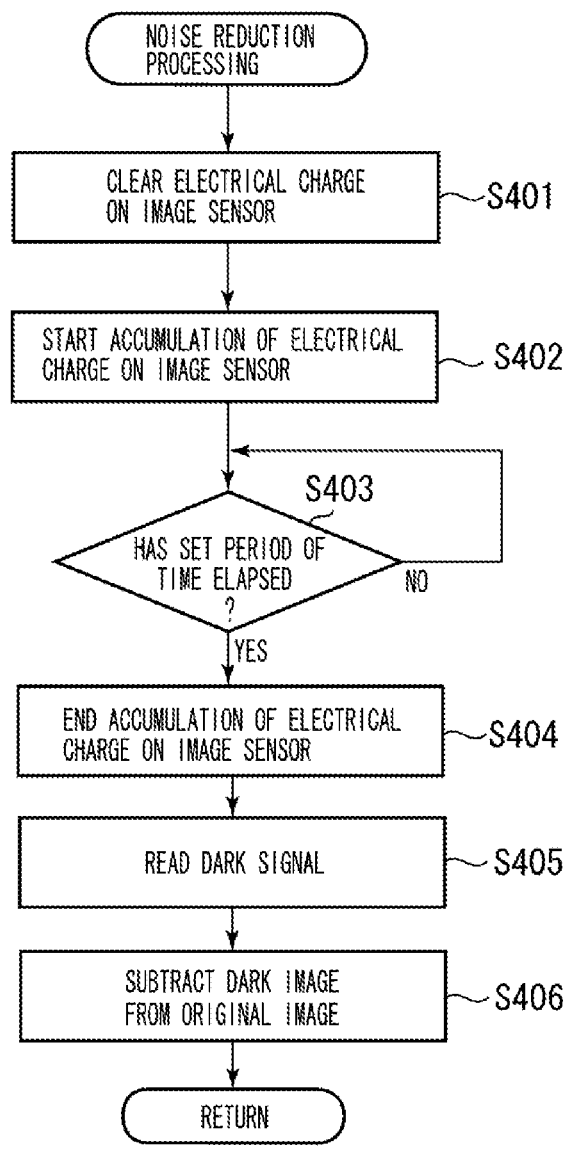
FIG. 11 is a flow chart illustrating an example of noise reduction processing according to an exemplary embodiment of the present invention.

Referring to FIG. 11, when the noise reduction processing starts, in step S401, the CPU 105 clears electrical charge on the image sensor 101. In step S402, the CPU 105 starts the accumulation of electrical charge. In this sequence, it is intended to obtain a dark image. Accordingly, the shutter is not opened after the accumulation of electrical charge has started.

In step S403, the CPU 105 detects whether the same length of time as the set exposure time for the original image has elapsed. If it is detected in step S403 that the same length of time as the set exposure time for the original image has elapsed (Yes in step S403), then the CPU 105 advances to step S404. In step S404, the CPU 105 ends the accumulation of electrical charge on the image sensor 101.

In step S405, the CPU 105 reads a signal of the dark image thus obtained as a signal from the image sensor 101. At this time, the image sensor 101 changes the value for the amplifier gain to the gain value according to the ISO sensitivity set by the user by operating the ISO sensitivity setting switch 113, as in the case of shooting an original image.

The CPU 105 temporarily stores the read image data on the RAM 107. In step S406, the CPU 105 performs processing for subtracting the dark image from the original image. In the dark image subtraction processing, considering the dark current amount estimated in step S314, the CPU 105 performs the processing for subtracting dark image data from the original image data stored on the RAM 107 with respect to each pixel and dark offset adding processing.

The data subjected to the subtraction processing and the addition processing can be temporarily stored on the RAM 107 or can be subjected to the development processing in step S210. After the subtraction processing is completed, the original image data and the dark image data on the RAM 107 are unnecessary and can be erased. Thus, the noise reduction processing (step S316) ends.

As described above, according to the present exemplary embodiment, the distribution of a minute flaw group can be identified with reference to the table illustrated in FIG. 9 according to the counter values of the counters 211 through 214, and thus the dark current amount can be easily estimated. As a result, the noise reduction processing can be effectively performed.

In the above-described exemplary embodiment, four comparators are used to determine the determination values. However, it is more useful if more than four combinations of determination values, comparators, and counters are used. In this case, the distribution of a flaw group of a specific level can be detected with higher accuracy.

In the case where more than four determination values are used, it is necessary to perform the determination with higher accuracy compared to the above-described example. However, the detection can be performed in a different method as long as which of the employed determination values around which a flaw pixel group of a specific flaw level exists can be detected. As a method for implementing such detection, various methods, such as linear approximation of continuous points, can be used.

When an output value of a specific flaw pixel group under a predetermined condition is previously obtained, if a determination value around which a flaw pixel group having a specific flaw level exists is detected with respect to an image obtained thereafter, the output value obtained at that time and a reference output value can be compared to each other. By converting the output value under such condition, an output value at that time can be estimated.

A simple calculation can be performed such that the output value becomes twice as high with a temperature rise of 80 to 10° C. and the output value is proportional to the exposure time and the ISO sensitivity. For example, suppose that in the case of shooting an image under a reference condition in which ISO 800 is employed, the temperature of the image sensor is 25° C., and the exposure time is one second, the center of distribution of the first minute flaw group is positioned at 10 mV, and the center of distribution of the second minute flaw group is positioned at 5 mV. Here, a pixel output is represented with an assumed voltage value.

In addition, suppose that when an output of a VOB portion of an image taken as an original image with ISO 400 and eight seconds of exposure time is detected, the first minute flaw group exists between 60 mV and 100 mV according to the above-described detection method. Here, each of the values "60 mV" and "100 mV" corresponds to any one of the determination values Th1 through Th4.

In this case, with the conversion according to the shooting condition, the exposure time is eight times as long and the ISO sensitivity is one half as compared with the reference condition. Here, supposing that the temperature of the image sensor is 25° C., it is likely that the center of distribution of the first minute flaw group exists around 40 mV.

As a result of the actual detection, the center of distribution of the first minute flaw group exists around 60 mV to 100 mV, which level is twice as high as the estimated value. Accordingly, the output value can be estimated to be twice as high. Furthermore, the temperature of the image sensor can be estimated to be 80 to 10° C. higher than 25° C.

In addition, the dark current amount of the image sensor can be estimated according to the relationship between the temperature and the average dark current amount previously detected.

For example, with respect to the image sensor whose temperature and dark current amount have been previously detected, a proportional coefficient "C1" between the distribution center of the first minute flaw group and the average dark current and a proportional coefficient "C2" between the distribution center of the second minute flaw group and the average dark current are previously stored on the ROM 106 or the RAM 107. Then, with calculation with an expression "approximate value×proportional coefficient", the average dark current level can be estimated.

For example, in the above-described example, when the distribution center of the first minute flaw group exists between 60 mV and 100 mV, the average dark current level can be estimated to exist between "60 mV×C1" and "100 mV×C1".

Then, when the estimated value is compared with a determination value for determining whether to perform noise reduction processing, the average dark current level can be estimated with higher accuracy than in the case of directly detecting the average dark current including a large amount of noise components.

In the above-described exemplary embodiment, the determination as to whether to perform noise reduction processing is performed according to a result of the previous estimation of the dark current amount. However, various correction processing, detection processing, and warning processing can be performed after the determination.

In addition, in the above-described present exemplary embodiment, the histogram generation circuit (FIG. 3) included in the DSP 103 generates a cumulative histogram. However, a unit or circuit other than the histogram generation circuit can generate a cumulative histogram. Alternatively, a cumulative histogram can be generated with processing software.

Furthermore, in the above-described exemplary embodiment, the determination as to whether to perform noise reduction processing is performed according to a detected output of the VOB portion 501a. However, any other optically light-shielded area can be used as an area whose output level is to be detected.

For example, the configuration can be arranged such that the output level of an area close to an amplifier of an image sensor, which can be a partial heat source, is detected, and a determination as to whether the heat from the amplifier affects the dark current level can be performed according to the detected output level. Alternatively, the output level in the aperture area when shielded from light can be detected in addition to the detection of the output level in the light-shielded area of the image sensor. Furthermore, the result illustrated in FIG. 9 can be utilized in correcting flaws.

The DSP 103 corrects a pixel whose flaw level is equal to or higher than a predetermined level. Here, if the dark level is at "Dark 0", the predetermined level can be set as a first level. If the dark level is at "Dark 2", the predetermined level can be set as a second level. In this manner, the flaw can be appropriately corrected according to the dark level.

Other Exemplary Embodiments

An exemplary embodiment of the present invention can be implemented by executing a program with a computer.

In addition, a unit for supplying a program to a computer, for example, a computer-readable recording medium (storage medium), such as a compact disc-read-only memory (CD-ROM), recording such a program or a transmission medium such as the Internet for transmission of the program can implement an exemplary embodiment of the present invention.

Furthermore, the program can implement an exemplary embodiment of the present invention. In addition, the above-described program, recording medium, transmission medium, and a program product can be included in the scope of the present invention.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2006-194755 filed Jul. 14, 2006, which is hereby incorporated by reference herein in its entirety.

What is claimed is:

1. An image apparatus comprising:
   an image sensor including a light-shielded pixel area;
   a plurality of comparison units configured to compare a light-shielded pixel output value output from at least a part of the light-shielded pixel area with a plurality of determination values which are set for each of the comparison units;
   a plurality of counting units configured to count the number of pixels whose output exceeds each of the plurality of determination values, wherein the plurality of counting units are arranged for each of the comparison units;
   a calculation unit configured to estimate an amount of dark current generated in the image sensor based on a result of counting performed by a counting unit; and
   a storage unit configured to store information about a ratio of a defect pixel output of the image sensor having a specific defect pixel level to an average dark current component output of a normal pixel of the image sensor, wherein the calculation unit is configured to use the information stored in the storage unit to estimate the amount of dark current.

2. The imaging apparatus according to claim 1, wherein the a comparison unit includes an area designation unit configured to designate an area within the light-shielded pixel area that outputs the light-shielded pixel output value that is to be compared by the plurality of comparison units with the plurality of determination values.

3. The imaging apparatus according to claim 1, further comprising:
   a dark current comparison unit configured to compare the amount of dark current estimated by the calculation unit with a preset reference value; and
   an image data correction unit configured to perform a correction operation for removing a dark current component from image data generated by the image sensor if it is determined by the dark current comparison unit that the amount of dark current is equal to or greater than the preset reference value.

4. A method performed in imaging apparatus which includes an image sensor having a light-shielded pixel area, a plurality of comparison units, a plurality of counting units and a calculation unit; the method comprising:
   via the plurality of comparison units, comparing a light-shielded pixel output value output from at least a part of the light-shielded pixel area with a plurality of determination values which are set for each of the comparison units;
   via the plurality of counting units, counting the number of pixels whose output exceeds each of the plurality of determination values, wherein the plurality of counting units are arranged for each of the comparison units; and via the calculation unit, estimating an amount of dark current generated in the image sensor based on a result of counting performed by a counting unit; and via a storage unit, storing information about a ratio of a defect pixel output of the image sensor having a specific defect pixel level to an average dark current component output of a normal pixel of the image sensor, wherein the calculation unit is configured to use the information stored in the storage unit to estimate the amount of dark current.

5. The method according to claim 4, wherein a comparison unit includes an area designation unit configured to designate an area within the light-shielded pixel area that outputs the light-shielded pixel output value that is to be compared by the plurality of comparison units with the plurality of determination values.

6. The method according to claim 4, further comprising:

via a dark current comparison unit, comparing the amount of dark current estimated by the calculation unit with a preset reference value; and via an image data correction unit, performing a correction operation for removing a dark current component from image data generated by the image sensor if it is determined by the dark current comparison unit that the amount of dark current is equal to or greater than the preset reference value.

* * * * *